(12) United States Patent
Schinelli et al.

(10) Patent No.: US 11,247,851 B2
(45) Date of Patent: Feb. 15, 2022

(54) STAR CONVEYOR FOR CONTAINERS

(71) Applicant: P.E. LABELLERS S.P.A., Porto Mantovano (IT)

(72) Inventors: Nicola Schinelli, Mantova (IT); Bruno Negri, Marmirolo (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 0 days.

(21) Appl. No.: 16/960,202

(22) PCT Filed: Jan. 8, 2019

(86) PCT No.: PCT/EP2019/050294
§ 371 (c)(1),
(2) Date: Jul. 6, 2020

(87) PCT Pub. No.: WO2019/137891
PCT Pub. Date: Jul. 18, 2019

(65) Prior Publication Data
US 2021/0061583 A1   Mar. 4, 2021

(30) Foreign Application Priority Data
Jan. 11, 2018  (IT) ........................ 102018000000708

(51) Int. Cl.
*B65G 47/86* (2006.01)
*B65B 35/16* (2006.01)
*B65B 35/26* (2006.01)

(52) U.S. Cl.
CPC ............ *B65G 47/847* (2013.01); *B65B 35/16* (2013.01); *B65B 35/26* (2013.01)

(58) Field of Classification Search
CPC ........ B65G 47/847; B65B 35/16; B65B 35/26
(Continued)

(56) References Cited

U.S. PATENT DOCUMENTS 8,556,062 B2 * 10/2013 Stoiber ................ B65G 47/847
198/470.1
9,517,898 B2 * 12/2016 Fahldieck .............. B65G 47/90
(Continued)

FOREIGN PATENT DOCUMENTS

DE            20305988 U1     7/2003

OTHER PUBLICATIONS

IT, Minister for Economic Development, Search Report and Opinion (with English translation), Italian Patent Office IT201800000708, 8 pages (dated Jan. 11, 2018).
(Continued)

*Primary Examiner* — Gene O Crawford
*Assistant Examiner* — Lester Rushin, III
(74) *Attorney, Agent, or Firm* — Thompson Hine LLP

(57) ABSTRACT

A star conveyor for containers which includes at least one supporting body which can move rotatably about a rotation axis, and supports peripherally a plurality of gripping devices, which are distributed around its rotation axis and are each adapted to retain a respective container to be conveyed; each one of the gripping devices includes at least one respective pair of gripping arms; at least one gripping arm of such pair of gripping arms includes a main body and at least one adapter element which is detachably attached to the main body and is interchangeable with at least one other adapter element of a different type, in order to vary the configuration of the at least one gripping arm according to the type of container to be conveyed.

15 Claims, 18 Drawing Sheets

(58) Field of Classification Search
USPC ...................................................... 198/470.1
See application file for complete search history.

(56) References Cited

U.S. PATENT DOCUMENTS

| | | | |
|---|---|---|---|
| 9,725,290 B2 * | 8/2017 | Fahldiek | B65G 47/847 |
| 10,023,399 B2 * | 7/2018 | Armellin | B29C 49/06 |
| 2002/0092731 A1 | 7/2002 | Osterfeld | |
| 2008/0190739 A1 | 8/2008 | Lanfranchi | |
| 2010/0282364 A1 | 11/2010 | Balzarin | |
| 2016/0355354 A1 * | 12/2016 | Fahldieck | B65G 29/00 |
| 2018/0086571 A1 * | 3/2018 | Fahldieck | B65G 47/847 |

OTHER PUBLICATIONS

PCT, European Patent Office (ISA/EP), International Search Report, International Application No. PCT/EP2019/050294, 4 pages (dated Mar. 15, 2019).

PCT, European Patent Office (ISA/EP), Written Opinion of the International Searching Authority, International Application No. PCT/EP2019/050294, 7 pages (dated Mar. 15, 2019).

* cited by examiner

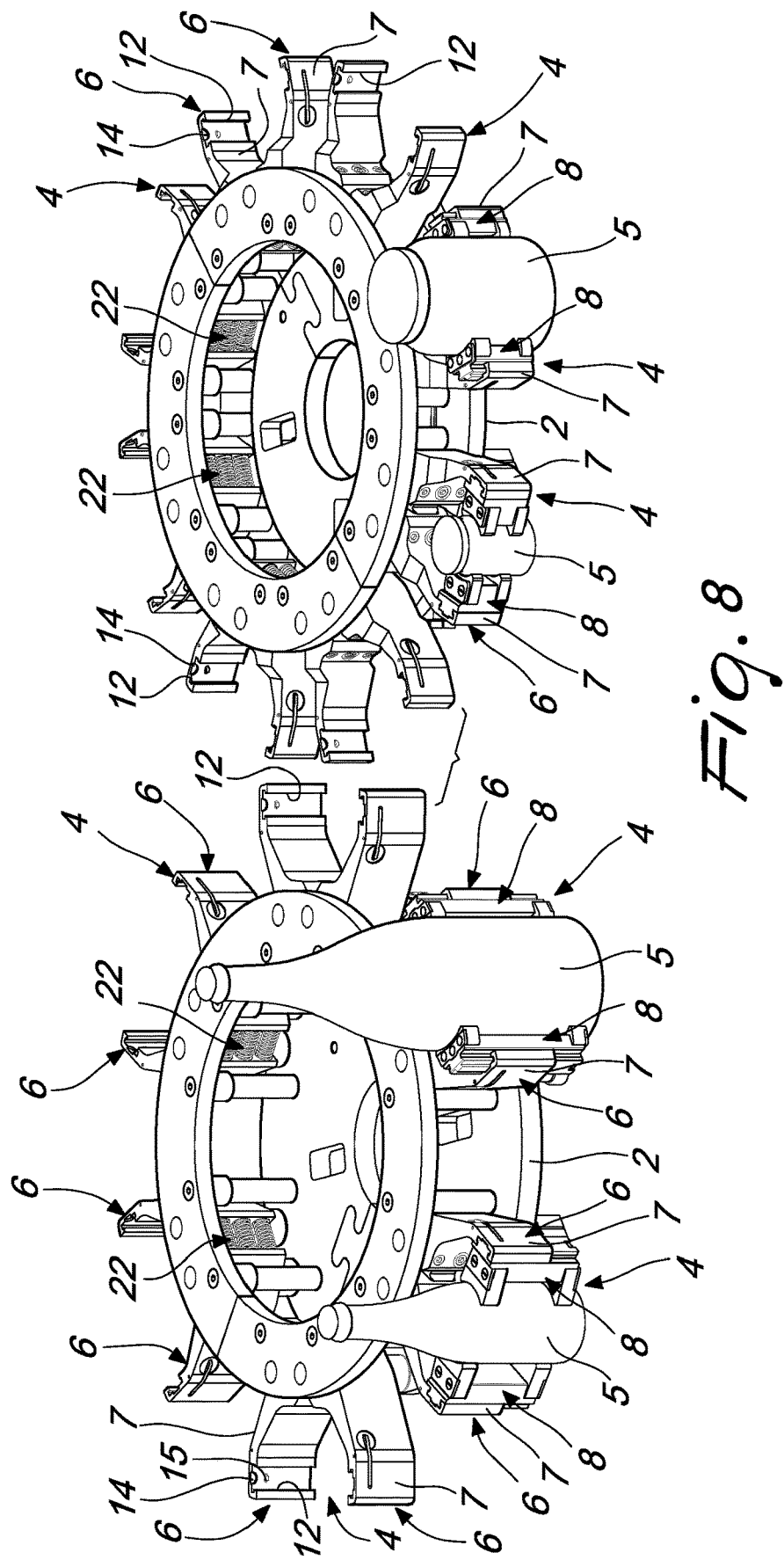

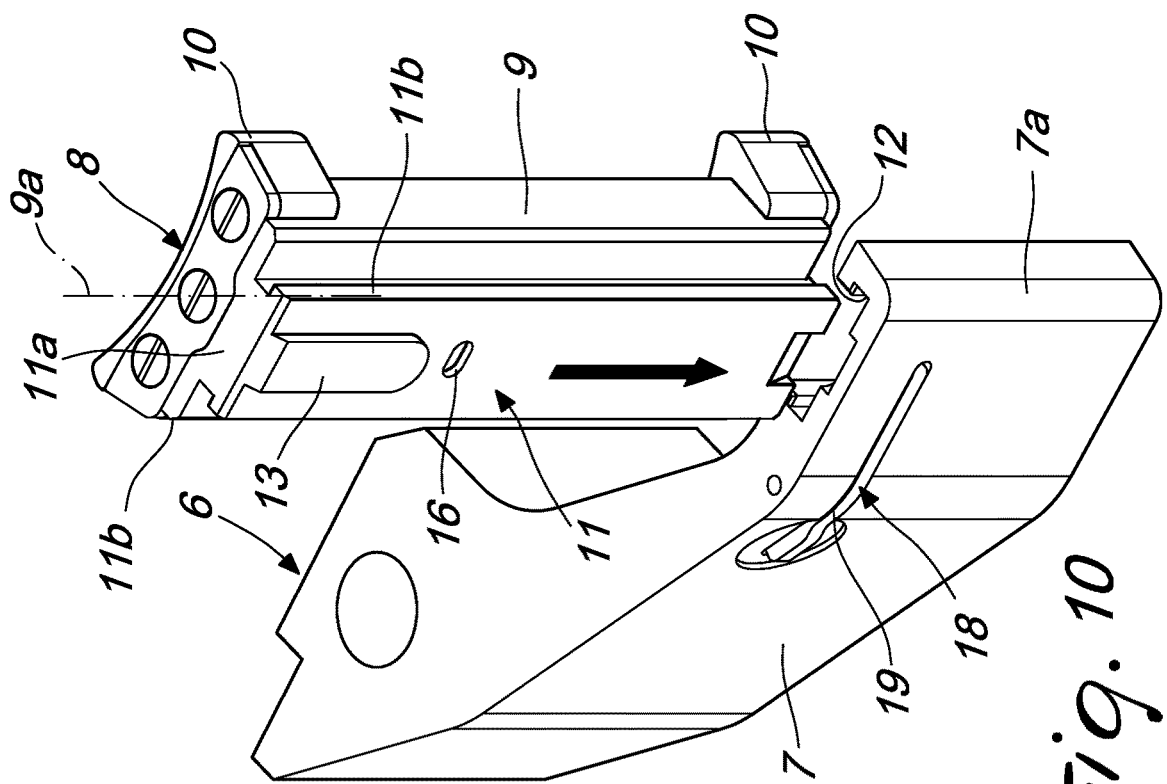
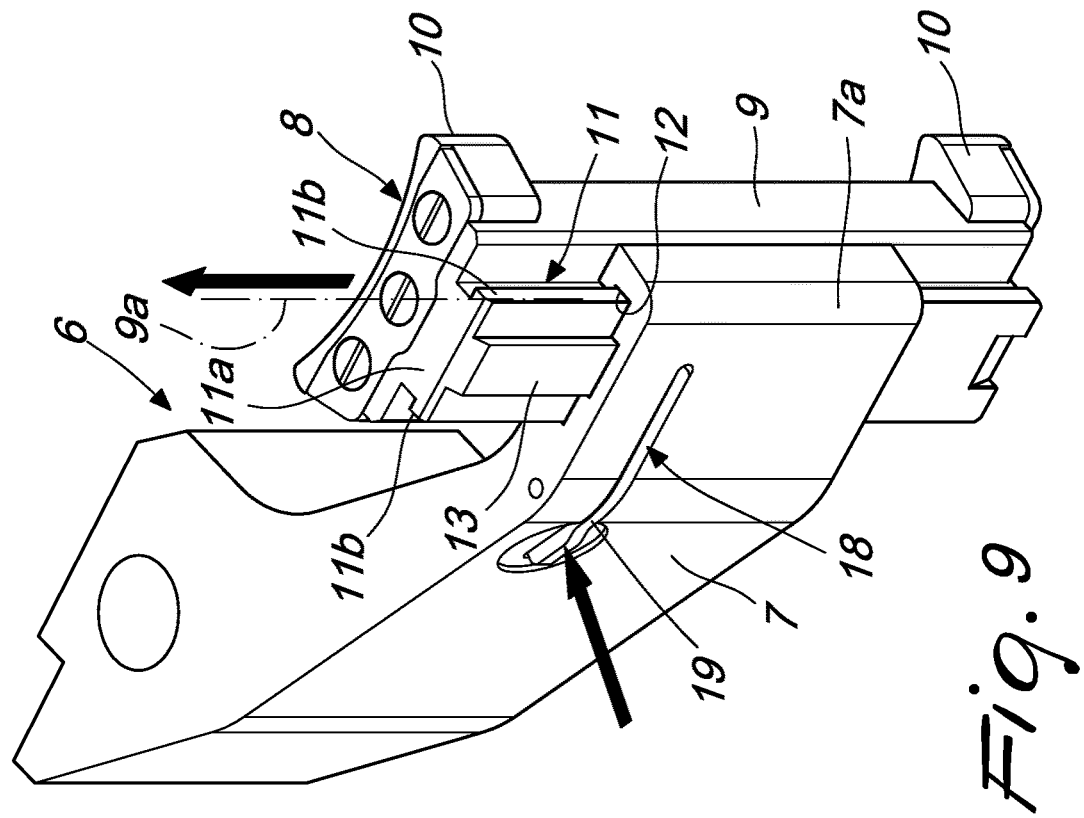

STAR CONVEYOR FOR CONTAINERS

The present invention relates to a star conveyor for containers.

As is known, machines for processing containers are provided with conveyors for the containers, which comprise one or more star conveyors, which in general have a disk-like base body, which rotates continuously about its own axis and which is peripherally provided with a plurality of reception zones for the containers, in order to enable the entrainment, along an advancement path, of the containers received in the corresponding reception zones.

Typically, in traditional star conveyors, the reception zones are provided by accommodation recesses that are open outward and are defined in the disk-like base body of the star conveyor, along its lateral perimeter, and which are contoured to match the shape and size of the containers that the star conveyors are used to convey. In order to keep the containers in the respective accommodation recesses, traditional star conveyors are commonly faced toward guide walls, known in the jargon as counter-stars, which surround the star conveyors for a certain portion of their circumferential extension, so that the containers can be conveyed in the space present between the star conveyors and the corresponding guide walls.

The drawback of traditional star conveyors is that, depending on the type of container to be conveyed and in particular on their shape and/or size, it is necessary to use different star conveyors.

Therefore, when changing the format of the containers to be processed, each one of the star conveyors present on the machine has to be replaced with another one that is adapted to convey the new format of the containers, and at the same time all the corresponding guide walls have to be replaced.

Another drawback of traditional star conveyors arises from the fact that in order to prevent the star conveyors from touching the labels applied to the containers, they are provided with two disk-like base bodies, mutually spaced apart along their axis, one designed to engage the lower part of the containers and the other the upper part, with the consequence that the star conveyors have quite a cumbersome structure that requires a great deal of storage space while it is not in use.

In order to try to make star conveyors more flexible and therefore capable of conveying containers of different formats, star conveyors have been introduced that have accommodation recesses that feature elastically-yielding portions or engagement bars that are adjustably movable toward or away from each other, with a scissors-like movement, which make it possible to vary, even if only to a limited extent, the useful volume of the accommodation recesses, so as to enable the accommodation recesses to receive containers of different dimensions.

However, these star conveyors still require a guide wall to enable the containers to stay in the accommodation recesses during their conveyance, and they cannot convey containers with a shape that differs considerably from the generic cylindrical shape, or containers that differ considerably in height, and so these star conveyors too have to be replaced when containers need to be handled that are not compatible with their structure.

Nowadays star conveyors are also known which have a rotating supporting body that supports, at its peripheral region, a plurality of gripping devices, which are distributed around its circumference and are each adapted to grip an individual container to be conveyed. Each gripping device is constituted by a respective pair of gripping arms, which face each other and extend substantially radially with respect to the rotation axis of the rotating base body and which generally have a curved shape that matches the cylindrical shape of the body of the containers. The gripping arms of each gripping device can rotate, at their end connected with the supporting body of the star conveyor, in order to pass from a mutually approached condition of clamping to a mutually spaced-apart condition of releasing the corresponding container, and vice versa.

The gripping arms can optionally be constituted by a pair of contact arms that are mutually superimposed and spaced apart, each one designed to engage respective portions of the corresponding container located at mutually different heights, while avoiding touching the label applied thereto.

These star conveyors have the advantage of not requiring a guide wall, but the gripping arms can lose traction on containers of large diameter. Furthermore, the gripping height, i.e. the distance between the contact arms, is fixed and therefore allows only containers with a preset height to be conveyed.

In order to at least attempt to overcome the above mentioned problems, star conveyors have also been introduced that are fitted with gripping arms that are position-adjustable, which, in addition to being of complex construction, require a great deal of time for their fine-tuning.

The aim of the present invention is to provide a star conveyor for containers which is capable of improving the known art in one or more of the above mentioned aspects.

Within this aim, an object of the invention is to provide a star conveyor for containers that does not necessitate its total substitution in the event of change of format of the containers.

Another object of the invention is to provide a star conveyor for containers that allows for the possibility of positively conveying a wide range of containers of different types.

Another object of the present invention is to provide a star conveyor for containers that, after simple operations, can also be used with contoured containers and with containers that differ considerably in height from each other.

Another object of the invention is to provide a star conveyor for containers that is free from adjustments.

Another object of the invention is to provide a star conveyor for containers that does not require extensive storage space for its components.

Another object of the invention is to provide a star conveyor for containers that does not require guide walls in order to entrain the containers.

A further object of the present invention is to overcome the drawbacks of the known art in an alternative manner to any existing solutions.

Another object of the invention is to provide a star conveyor for containers that is highly reliable, easy to implement and, furthermore, can be provided at low cost.

Further characteristics and advantages of the invention will become better apparent from the description of some preferred, but not exclusive, embodiments of the star conveyor for containers according to the invention, which are illustrated for the purposes of non-limiting example in the accompanying drawings wherein:

FIG. 8 is a perspective view of two star conveyors according to the invention with different types of adapter elements applied at some gripping devices;

FIG. 9 is a perspective view of a gripping arm of the star conveyor according to the invention;

FIG. 10 is an exploded perspective view of a gripping arm of the star conveyor according to the invention;

Figure 1:
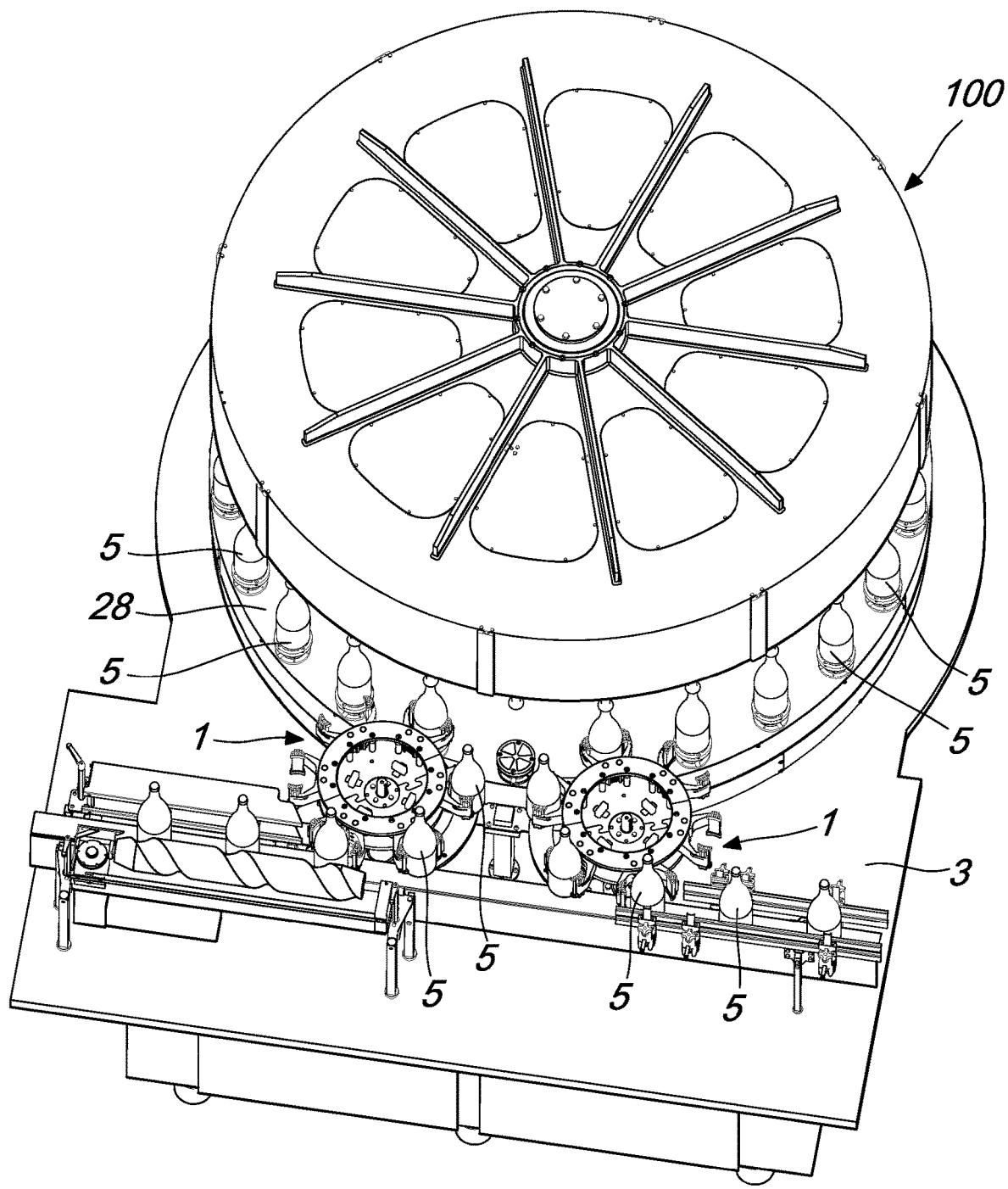
FIG. 1 is a perspective view from above of an example of a machine for processing containers which is provided with star conveyors according to the invention.
Figure 2:
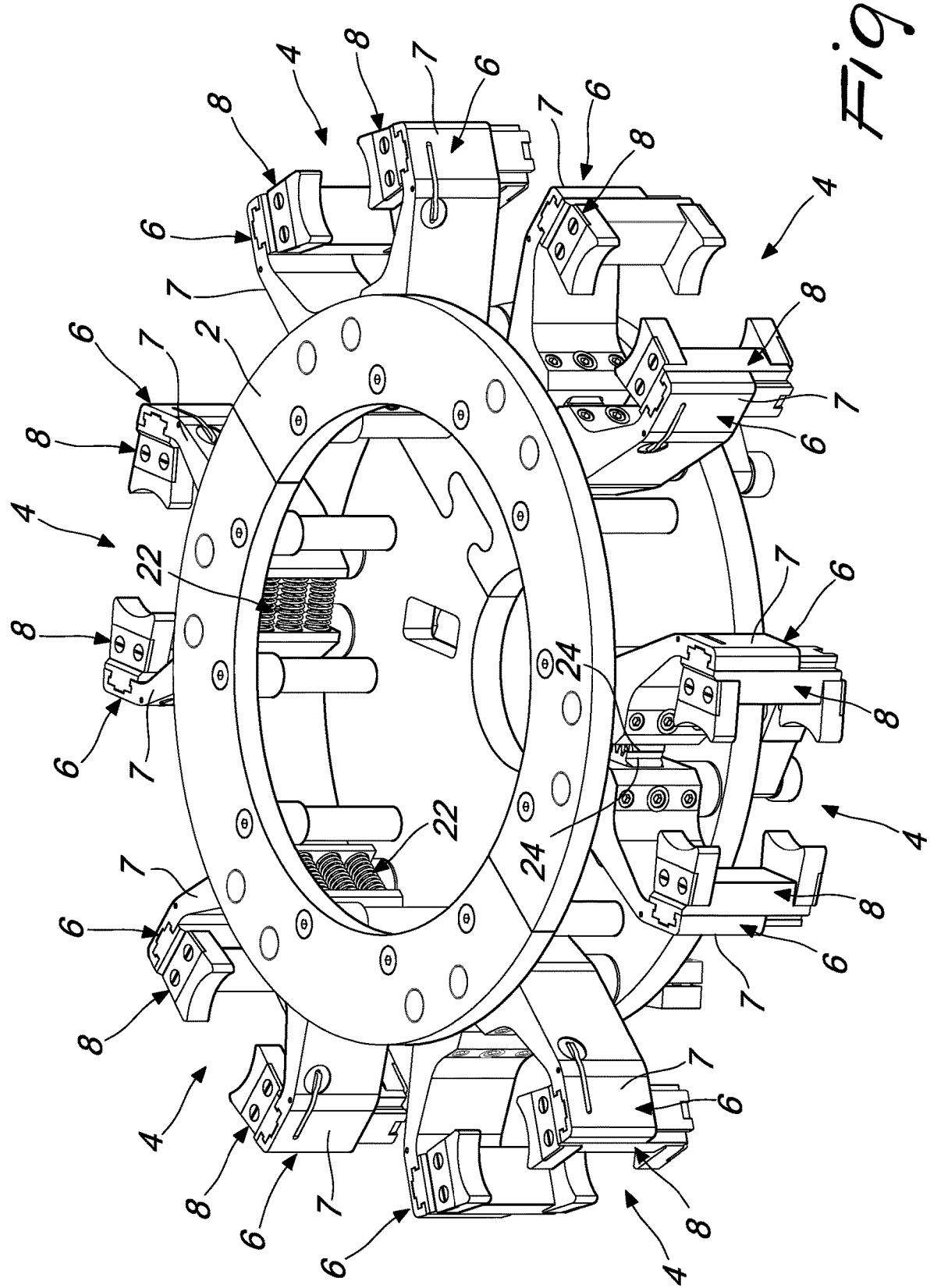
FIG. 2 is a partial perspective view of a star conveyor according to the invention.
Figure 3:
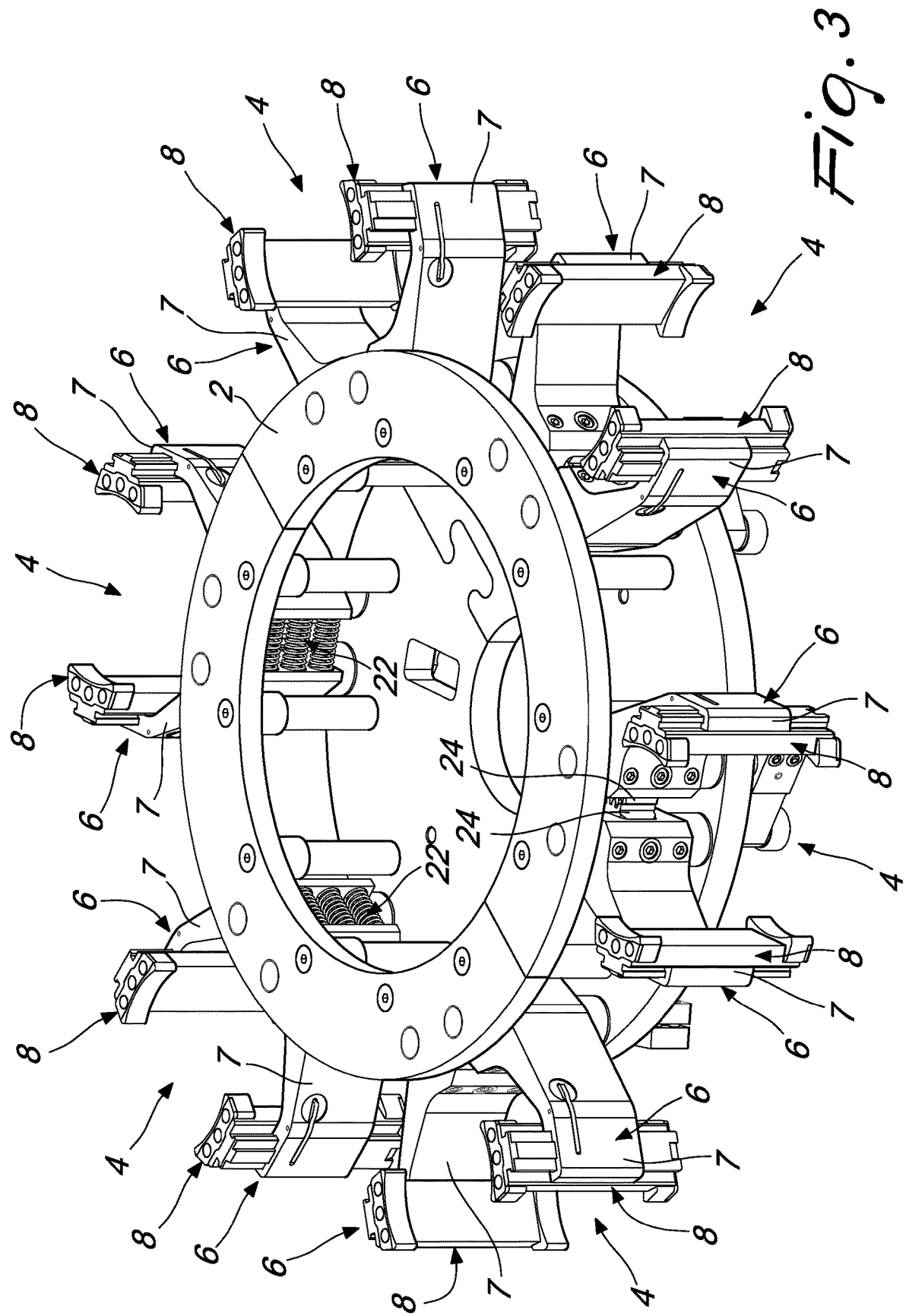
FIG. 3 is a partial perspective view of a star conveyor according to the invention with adapter elements of a different type from those in FIG. 2 applied to the gripping arms of its gripping devices.
Figure 4:
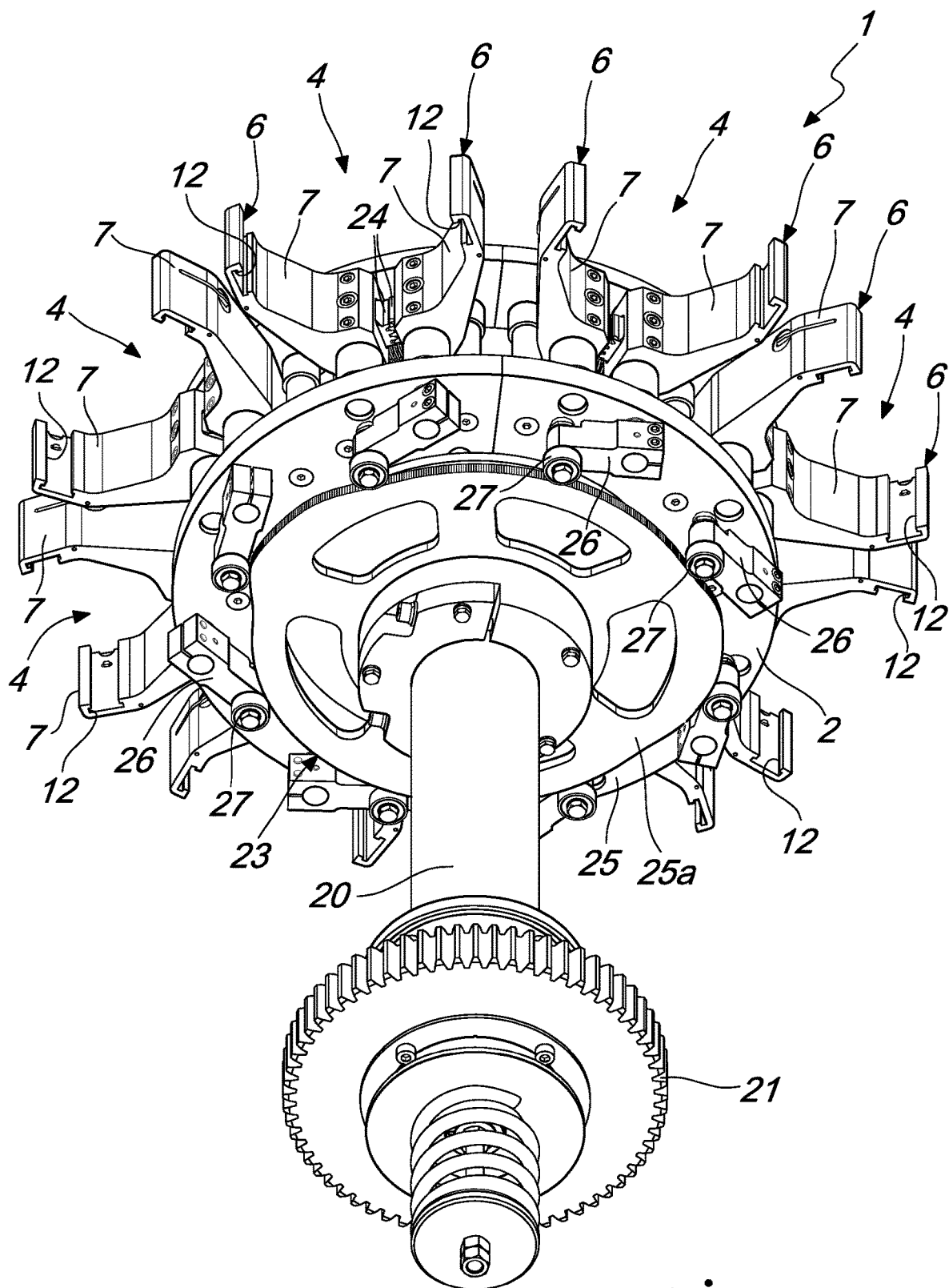
FIG. 4 is a perspective view from below of a star conveyor according to the invention, in which the adapter elements have been omitted.
Figure 5:
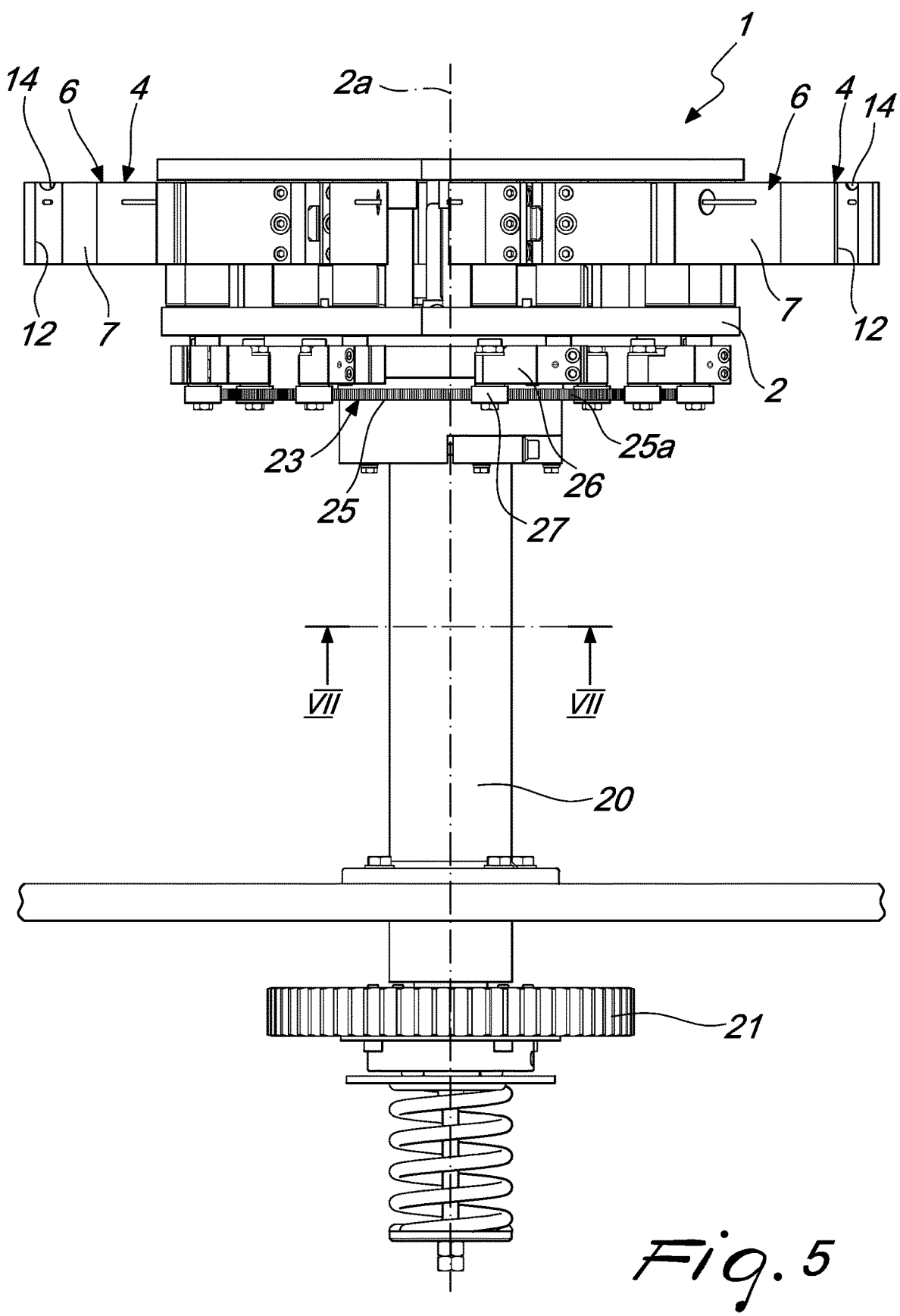
FIG. 5 is a side view of a star conveyor for containers according to the invention, with the adapter elements omitted.

With reference to the figures, the star conveyor for containers according to the invention, generally designated by the reference numeral 1, comprises at least one supporting body 2 which can move rotatably about a rotation axis 2a, with respect to a fixed framework 3, and supports peripherally a plurality of gripping devices 4, which are distributed around the rotation axis 2a and are each able to retain a respective container 5 to be conveyed.

Each one of the gripping devices 4 comprises at least one respective pair of gripping arms 6 which face each other and can move, with respect to each other, between a condition of clamping the corresponding container 5, in which the gripping arms 6 are in a mutually approached position, and a condition of releasing the corresponding container 5, in which the gripping arms 6 are in a mutually spaced-apart position.

According to the invention, at least one of the gripping arms 6 of each gripping device 4 comprises a main body 7 and at least one adapter element 8 which is detachably attached to the main body 7 and is interchangeable with at least one other adapter element 8 of a different type, in order to vary the configuration of the gripping arm 6 according to the type of container 5 to be conveyed.

Advantageously, the gripping arms 6 of each one of the gripping devices 4 comprise respective main bodies 7 and respective adapter elements 8 which are detachably attached to the main bodies 7 and are interchangeable in order to vary the configuration of both gripping arms 6, according to the type of container 5 to be conveyed.

In this manner, with each change of format of the containers 5, instead of completely replacing the star conveyor, it will be sufficient to replace only the adapter elements 8, thus adapting the star conveyor to the new format of the containers 5 in a very simple manner.

Conveniently, it is envisaged that the star conveyor is supplied with at least two interchangeable sets of adapter elements 8 which are detachably attachable to the main bodies 7 of the gripping arms 6. In particular, the adapter elements 8 of each one of such sets are structured to conform to a corresponding type of container 5 to be conveyed. For example, there can be at least one first set of adapter elements 8 which are structured to adapt the gripping arms 6 to a corresponding first type of container 5 and at least one second set of adapter elements 8 which are structured to adapt the gripping arms 6 to a corresponding second type of container 5, where the first type of container 5 can differ from the second type of container 5 in dimensions and/or shape. Thus, for each type of container 5 envisaged on the market, a corresponding set of adapter elements 8 can be provided which are structured so as to match it.

In greater detail, the main bodies 7 of the gripping arms 8 extend, as illustrated, substantially radially from the rotation axis 2a of the supporting body 2.

Figure 11:
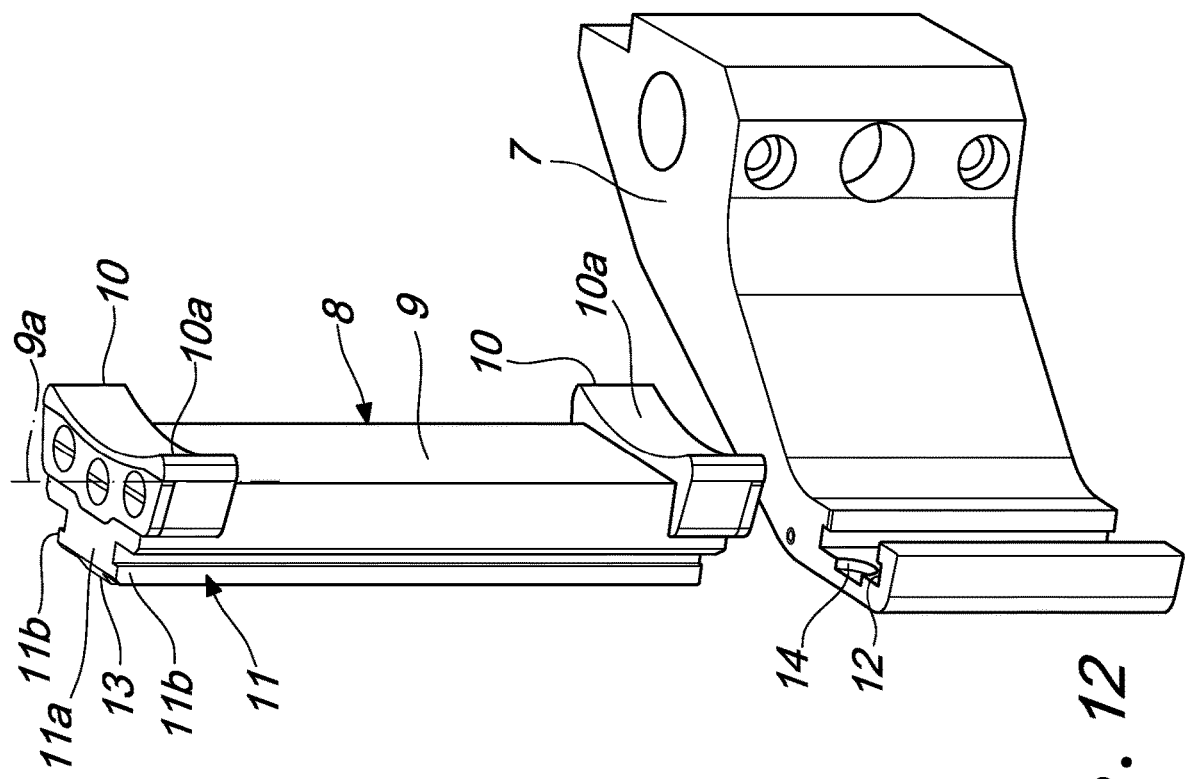
FIG. 11 is a perspective view from a different angle from FIG. 9 of a gripping arm.
Figure 12:
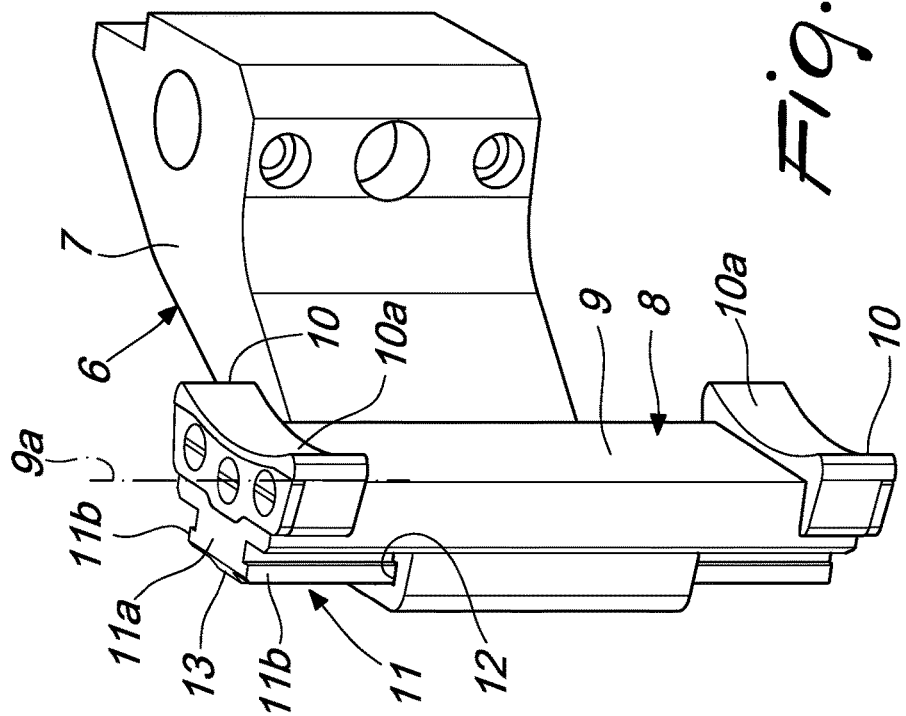
FIG. 12 is an exploded view of the gripping arm in FIG. 11.
Figure 13:
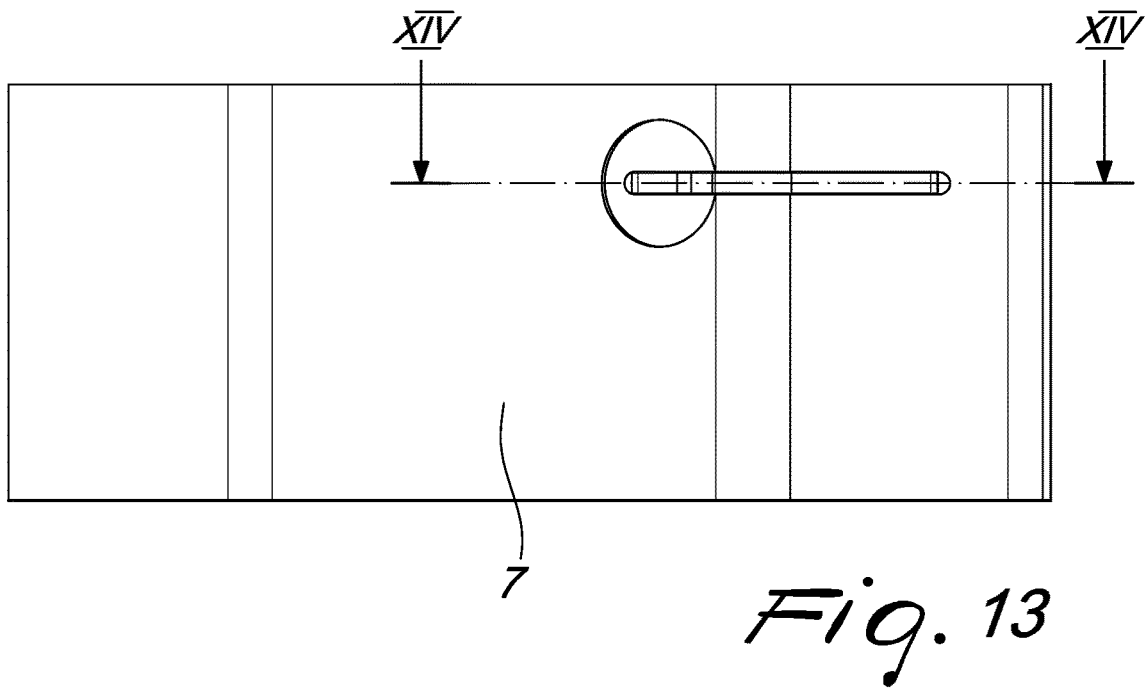
FIG. 13 is a side view of a gripping arm of a gripping device of the star conveyor according to the invention.
Figure 14:
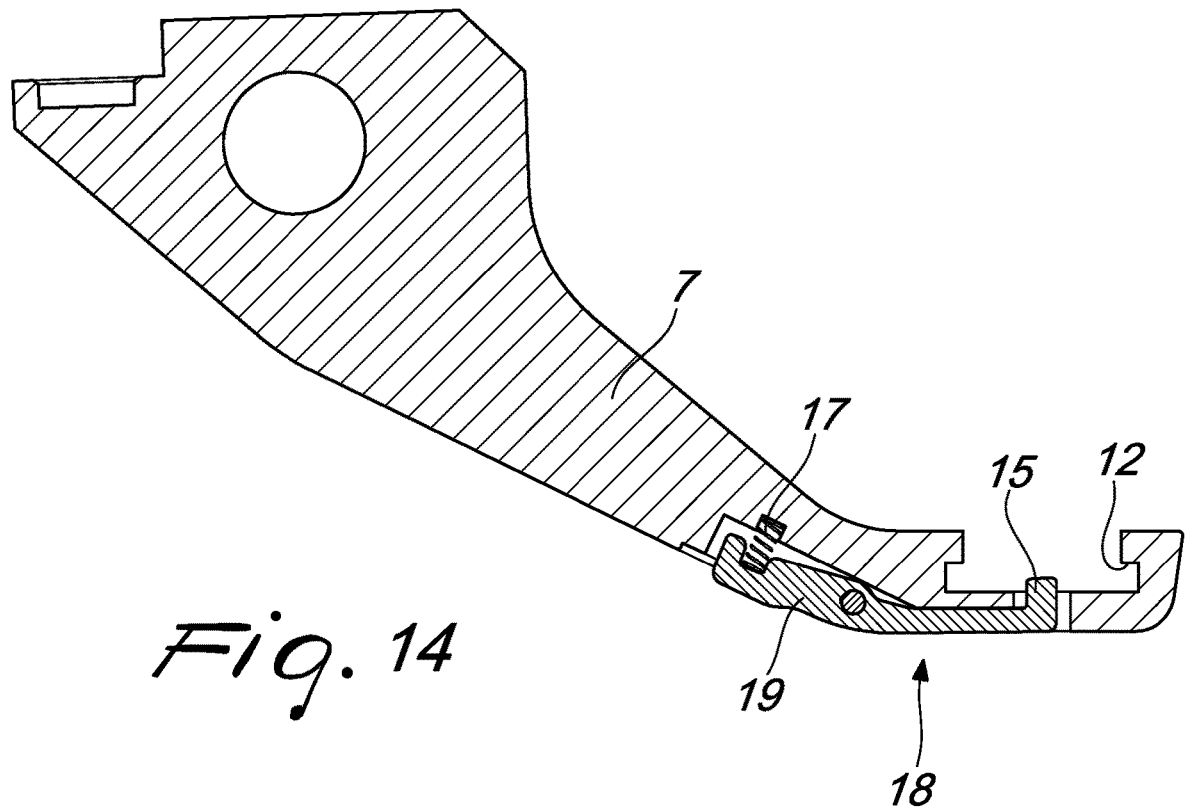
FIG. 14 is a cross-sectional view taken along the line XIV-XIV in FIG. 13.

Conveniently, as can be seen in particular in FIGS. 9 and 11, the adapter elements 8 are detachably attachable substantially at the free end 7a of the main bodies 7 of the gripping arms 6, i.e. of their end directed away from the supporting body 2.

Advantageously, each adapter element 8 is provided with a base body 9 which has at least one direction of extension 9a which extends substantially parallel to the axis of the container 5 for which it is correspondingly structured. In particular, the length extension of the base body 9 along the direction of extension 9a will depend, in practice, on the height of the container 5 to which the corresponding adapter element 8 corresponds.

Conveniently, on a face thereof that is intended to be directed toward the container 5, the base body 9 of the adapter elements 8 supports at least one contact element 10 which is shaped complementarily to the corresponding type of container 5 and is designed to engage that container by contact.

As in the examples illustrated, in particular, in FIG. 9, the base body 9 supports at least two contact elements 10, arranged at the opposite ends of the base body 9 which are defined along its direction of extension 9a and are designed to make contact with mutually vertically spaced-apart regions of the corresponding container 5.

More specifically, as can be seen, the contact elements 10 of the various types of adapter elements 8 have, on their side opposite to the base body 9, an engagement recess 10a, which is designed to accommodate at least one portion of the corresponding container 5 and which is, as a consequence, contoured so as to match the shape and the size of the corresponding container 5 in the region where it engages it.

It should be noted, furthermore, that the contact elements 10 can protrude variously from the base body 9, in the opposite direction from the main body 7 of the gripping arms 6, according to the type of container 5 to which the corresponding adapter elements 8 correspond.

Advantageously, the contact elements 10 can be made of elastically deformable material and, in particular, they are constituted by pads of rubber or of expanded material or the like.

Advantageously, the adapter elements 8 comprise means for coupling to the main bodies 7 of the gripping arms 6, which are conveniently constituted by means for quick attachment.

Conveniently, such means for quick attachment comprise an engagement element 11, which is defined on the face of the base body 9 lying opposite the face intended to be directed toward the container 5 and is engageable with a complementarily-shaped coupling seat 12, which is defined on the main body 7 of the gripping arms 6 and can be engaged by the engagement element 11 by way of a sliding movement of the base body 9, with respect to the main body 7 of the gripping arms 6, along a direction substantially parallel to the direction of extension 9a of the base body 9.

More specifically, the engagement element 11 is constituted by a prominence 11a, protruding from the base body 9 and extending parallel to the direction of extension 9a of the latter, and by a pair of lateral protrusions 11b, which protrude, on mutually opposite sides, from the prominence 11a and are spaced apart from the base body 9, and which are designed to engage respective undercut regions defined in the coupling seat 12.

Conveniently, a stop element 13 is further defined on the base body 9 and is arranged, for example, at the prominence 11 and is designed to abut against an abutment region 14, defined conveniently at the coupling seat 12, in order to lock the relative sliding motion between the base body 9 and the main body 7 of the gripping arms 6, in the direction that allows the engagement of the engagement element 11 in the coupling seat 12, once the base body 9 has reached its correct position with respect to the main body 7 of the gripping arms 6.

Conveniently, there are also detachable means for snap-locking the adapter elements 8 to the main body 7 of the gripping arms 6, which comprise, for example, for each one of the gripping arms 6, a locking element 15 which is supported by the corresponding main body 7 and is designed to engage with snap-action a locking seat 16 which is defined on the base body of the adapter elements 8.

Conveniently, the locking element 15 is kept protruding from the main body 7 of the corresponding gripping arm 6 by a thrust spring 17 and is, advantageously, connected to an actuation element 18, which is constituted, for example, by a lever element 19, rotatably fitted on the main body 7 of the corresponding gripping arm 6, and which can be actuated to cause the disengaging of the locking element 15 from the locking seat 16, in contrast with the thrust spring 17.

For completeness, it should be noted that the rotary actuation of the supporting body 2 of the star conveyor can, for example, be obtained by way of a driving shaft 20, which is arranged coaxially to the rotation axis 2a of the supporting body 2 and which is made to rotate, about its own axis, by a gearwheel 21, which is integral therewith and in turn connected kinematically to drive means, not shown.

It should further be noted that, conveniently, the gripping arms 6 of the gripping devices 4 are kept in the condition of clamping by elastic means 22 which are interposed between them, while the movement of the gripping arms 6 from their condition of clamping to their condition of releasing can be achieved by way of a cam actuation device 23, in contrast with the elastic means 22.

In particular, as illustrated, the gripping arms 6 of each gripping device 4 are individually hinged to the supporting body 2 and are mutually kinematically connected by way of respective sets of teeth 24 which mesh with each other. The cam actuation device 23 comprises, advantageously, an abutment body 25, which is fixed with respect to the supporting body 2 of the star conveyor, and which is provided perimetrically with a cam-like profile 25a.

At least one of the two gripping arms 6 of each gripping device 4 is connected to one end of an actuation lever 26 which, by way of a roller 27, arranged at its other end, slideably engages the cam-like profile 25a, during the rotation of the supporting body 2, with respect to the abutment body 25, so as to cause the rotation of the actuation levers 26, at determined angular positions of the supporting body 2, with the consequent transition of the gripping arms 6 from the condition of clamping to the condition of releasing.

Advantageously, as shown in FIG. 1, one or more star conveyors according to the invention can be arranged along a conveyor belt of containers 5 of a machine 100 for processing the containers 5.

In particular, it is possible, for example, to arrange a first star conveyor according to the invention at the input of a movement carousel 28 for containers 5 and a second star conveyor according to the invention at the output of the containers 5 from the movement carousel 28.

It should be noted that adapter elements 8 can be coupled to the main bodies 7 of the gripping arms 8 of all the gripping devices 4 that are present on the star conveyor or only on some of them.

Figure 6:
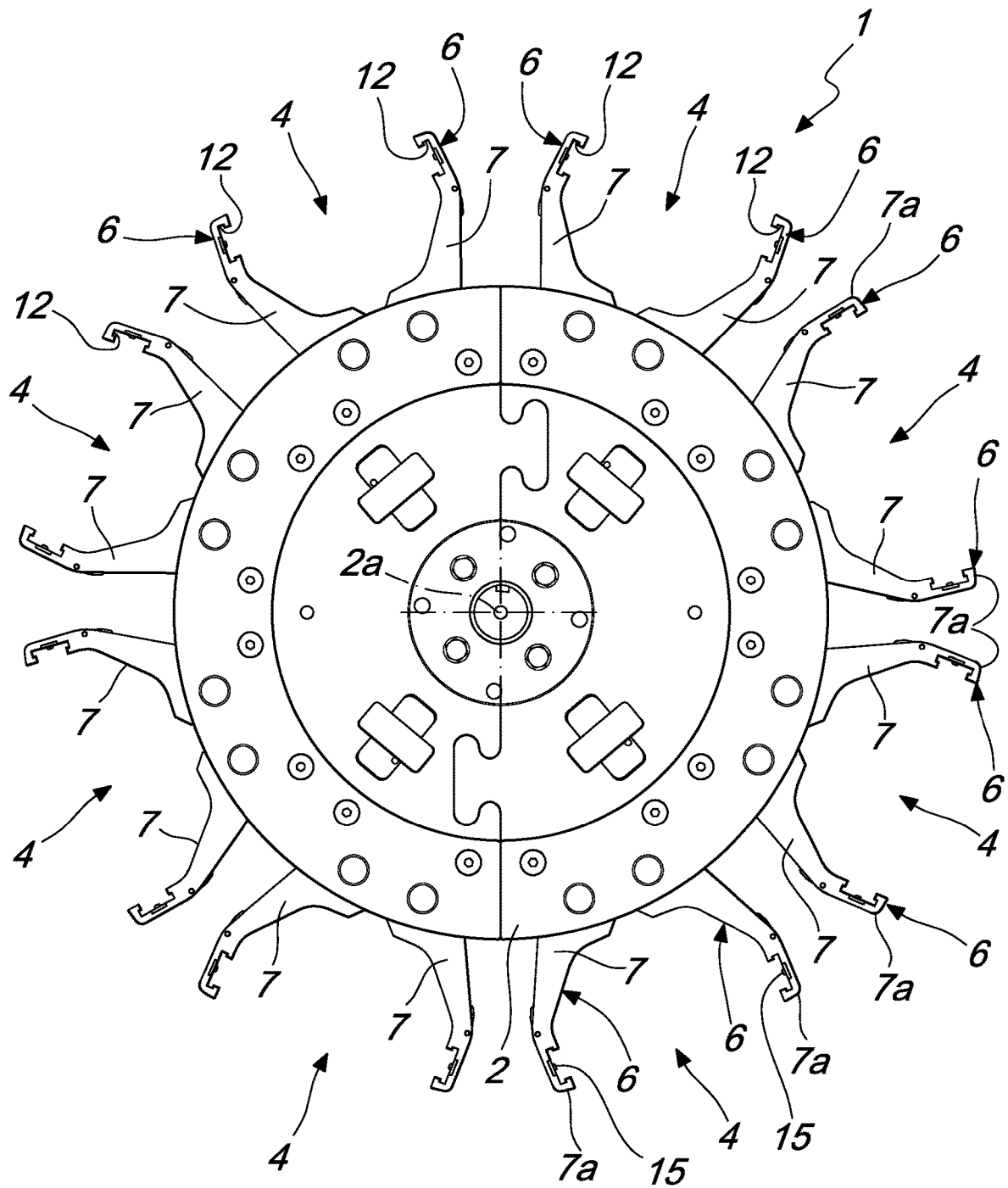
FIG. 6 is a plan view from above of the star conveyor according to the invention, in which the adapter elements are omitted.
Figure 7:
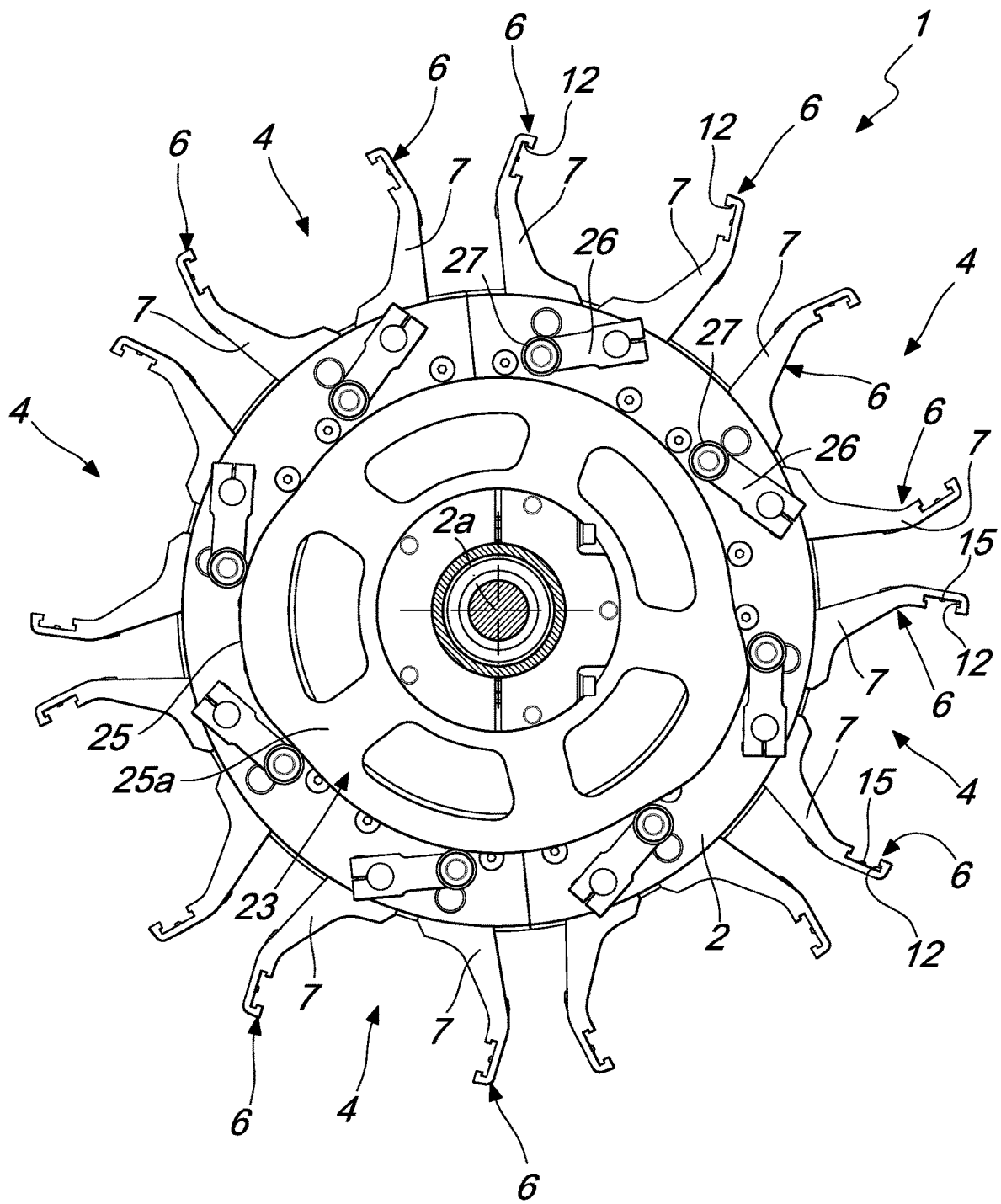
FIG. 7 is a cross-sectional view taken along the line VII-VII in FIG. 5.

Furthermore, as shown for the purposes of example in FIG. 6, it is also possible to couple adapter elements 8 of at least a first type to the main bodies 7 of the gripping arms 8 of some gripping devices 4 of the star conveyor and adapter elements 8 of at least a second type to the main bodies 7 of the gripping arms 8 of other gripping devices 4 of the star conveyor, so as to enable the same star conveyor to validly convey at least two mutually different types of container 5.

For example, adapter elements 8 of the first and of the second type can be associated with the respective gripping devices 4 so that the gripping devices 4 with which the adapter elements 8 of the first type are associated are arranged alternating, in the sequence of gripping devices 4 about the axis of the supporting body 2 of the star conveyor, with the gripping devices 4 with which the adapter elements 8 of the second type are associated. In this case, adapted means for putting the star conveyor in phase are provided in order to enable the gripping devices 4 with the different types of adapter elements 8 to receive from conveyors arranged upstream and to give to conveyors arranged downstream of the star conveyor the corresponding types of container 5.

As is shown, by way of example, in FIGS. 15 to 20, it is also possible for the adapter elements 8 applied to the main body 7 of the gripping arms 6 of each or some of the gripping devices 4 of the star conveyor, even though both are structured to match a specific type of container 5, to have a mutually different shape structure, in particular with reference to their base body 9 and/or to their contact elements 10, except, conveniently, for the part that enables their coupling to the main bodies 7 of the gripping arms 6, i.e. of the means for coupling.

Figure 15:
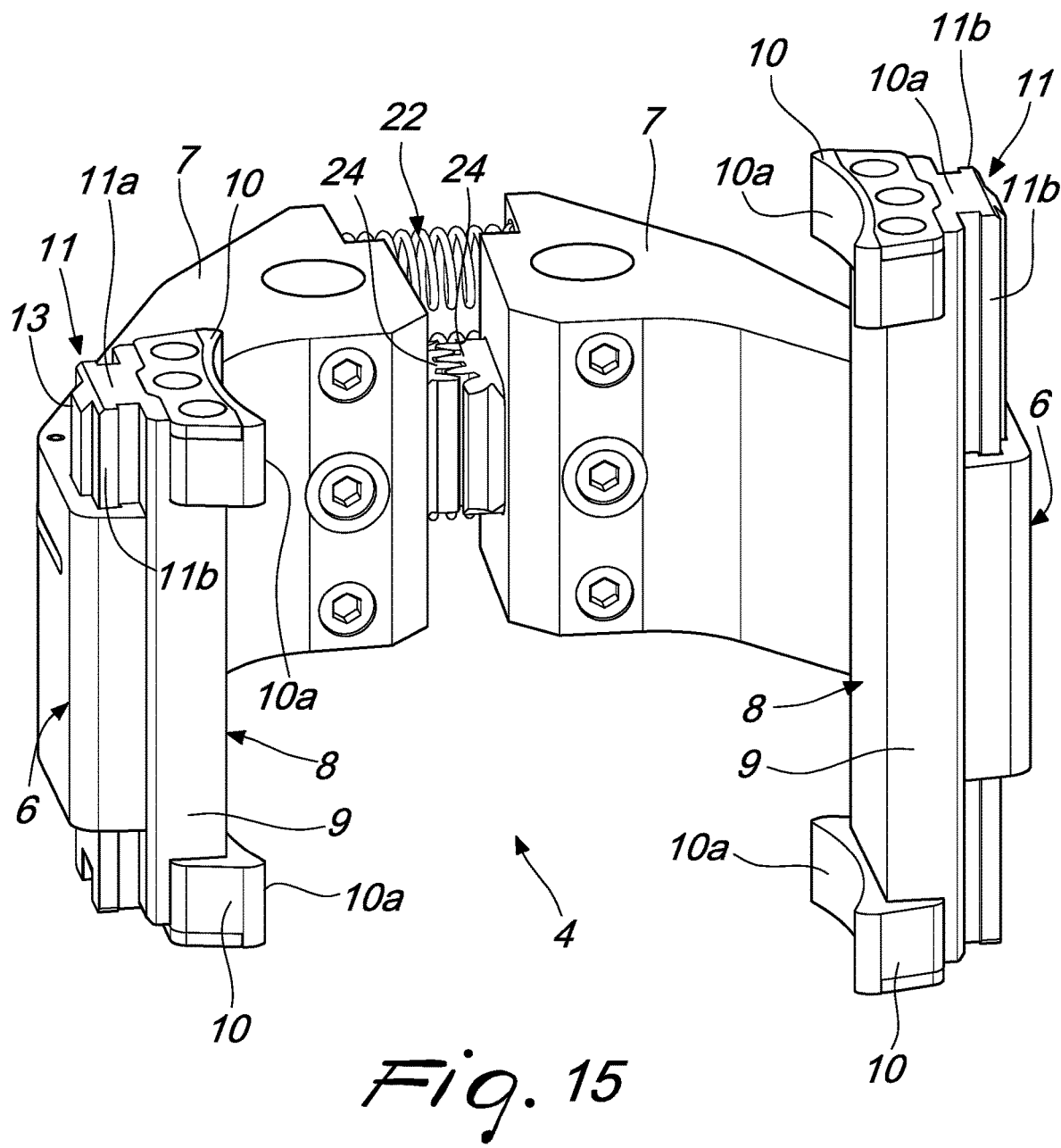
FIG. 15 is a perspective view of a gripping device of the star conveyor according to the invention with adapter elements of a special type applied, which have a different shape structure from each other.
Figure 16:
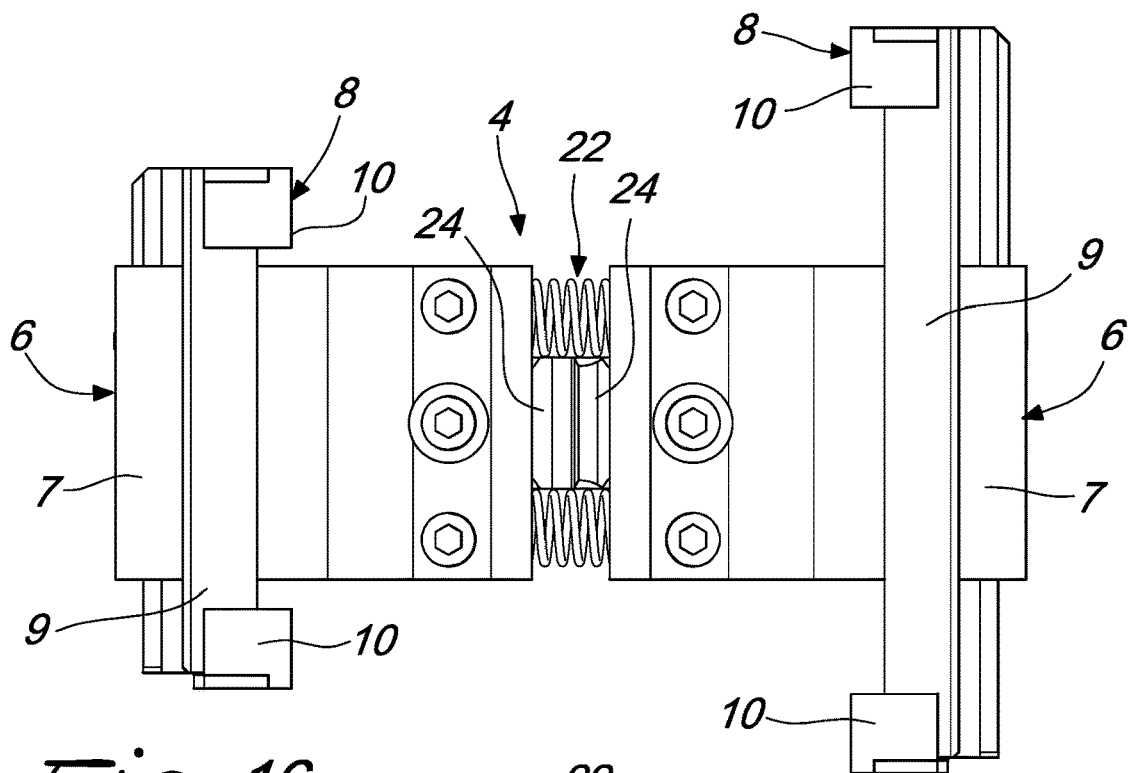
FIG. 16 is a front elevation view of the gripping device in FIG. 15.
Figure 17:
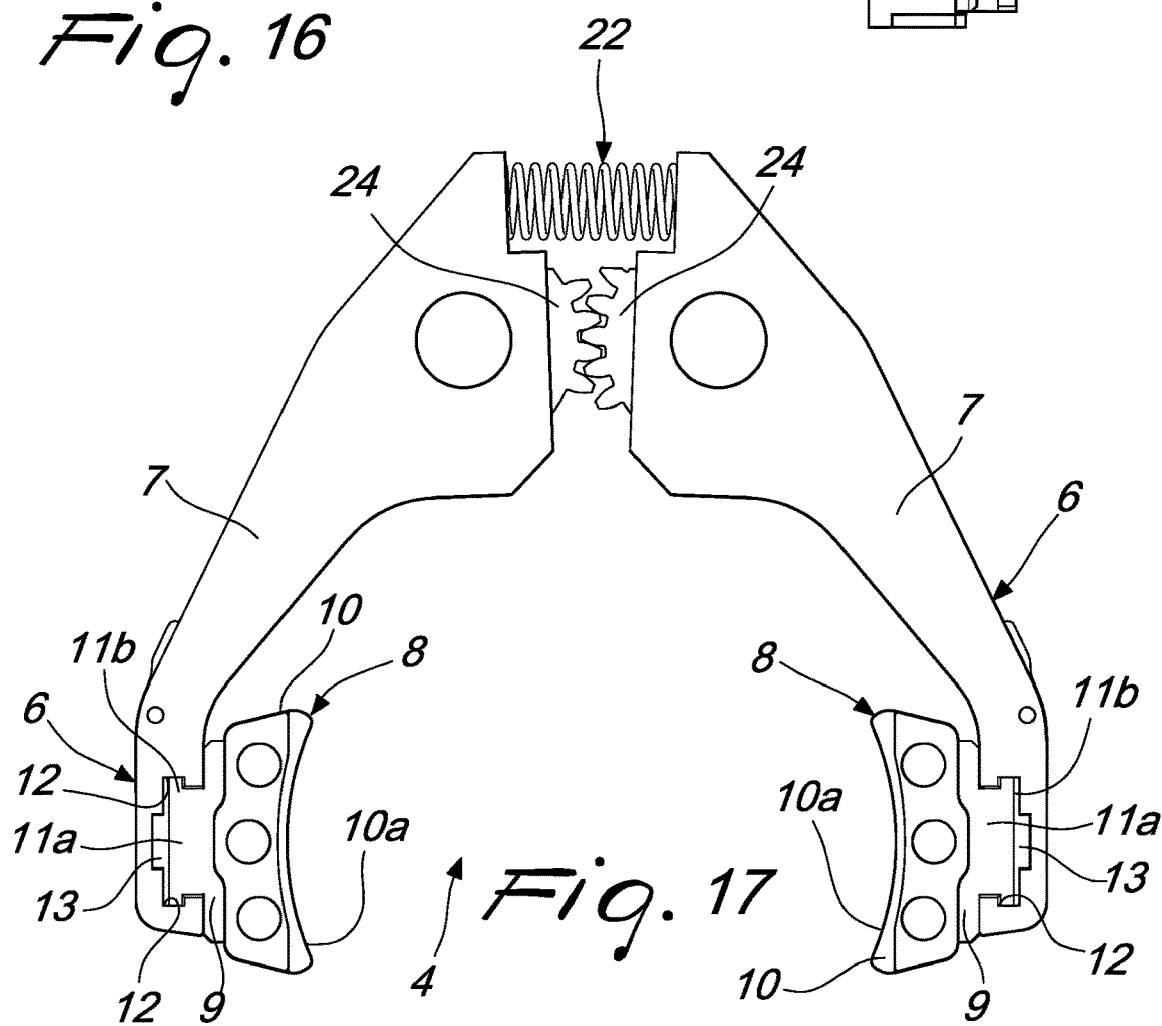
FIG. 17 is a view from above of the gripping device in FIG. 15.

For example, as in the case shown in FIGS. 15, 16 and 17, the two adapter elements 8 coupled to the main body 7 of the gripping arms 6 of a gripping device 4 can have a different length of their base body 9, so as to have one shorter than the other, so as to avoid covering, with the shorter one, any zones of the container 5 that are designed to receive particular identifying labels, which otherwise would not be visible.

Figure 18:
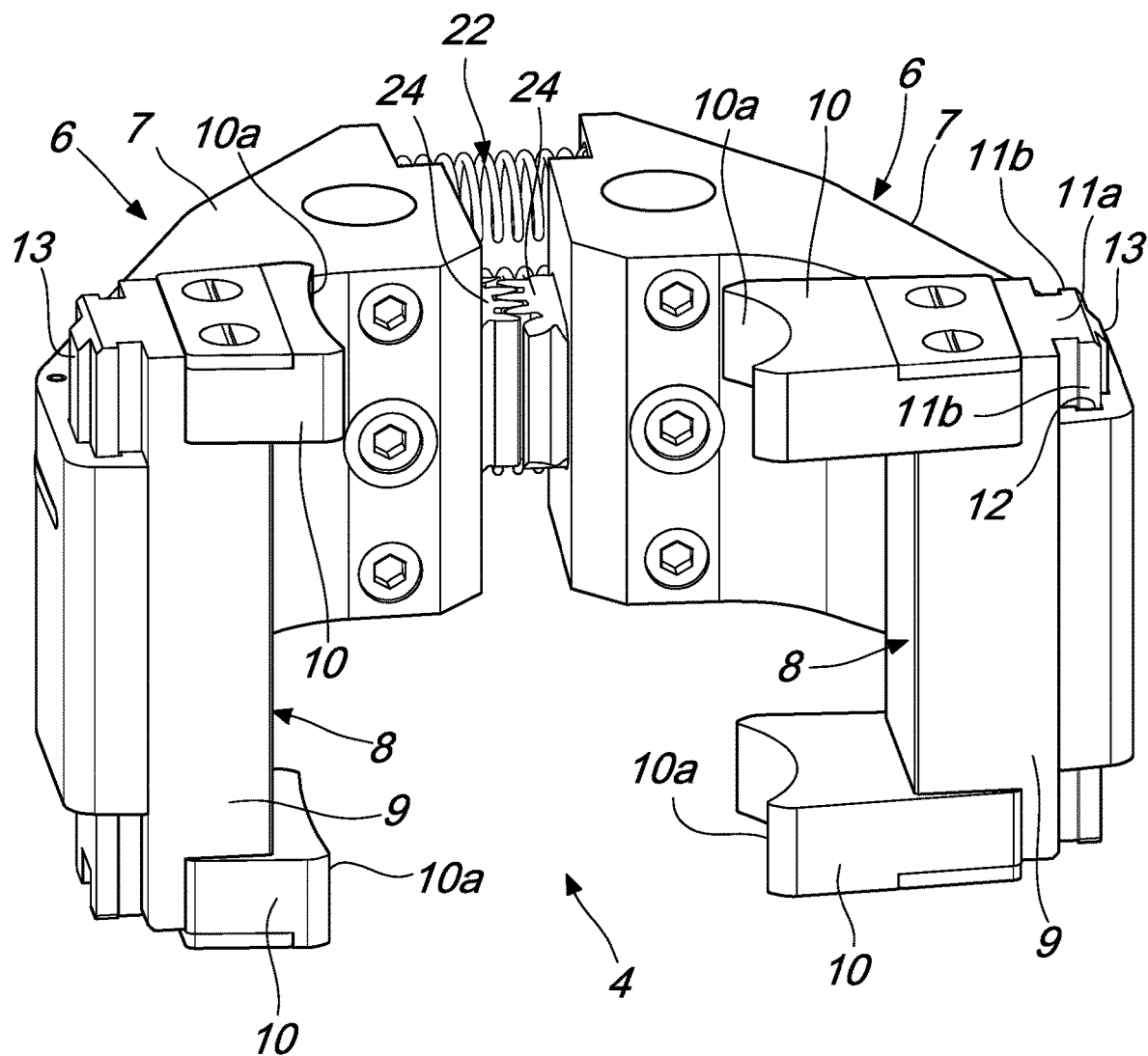
FIG. 18 is a perspective view of a gripping device of the star conveyor according to the invention with the application of adapter elements different from those in FIG. 15.
Figure 19:
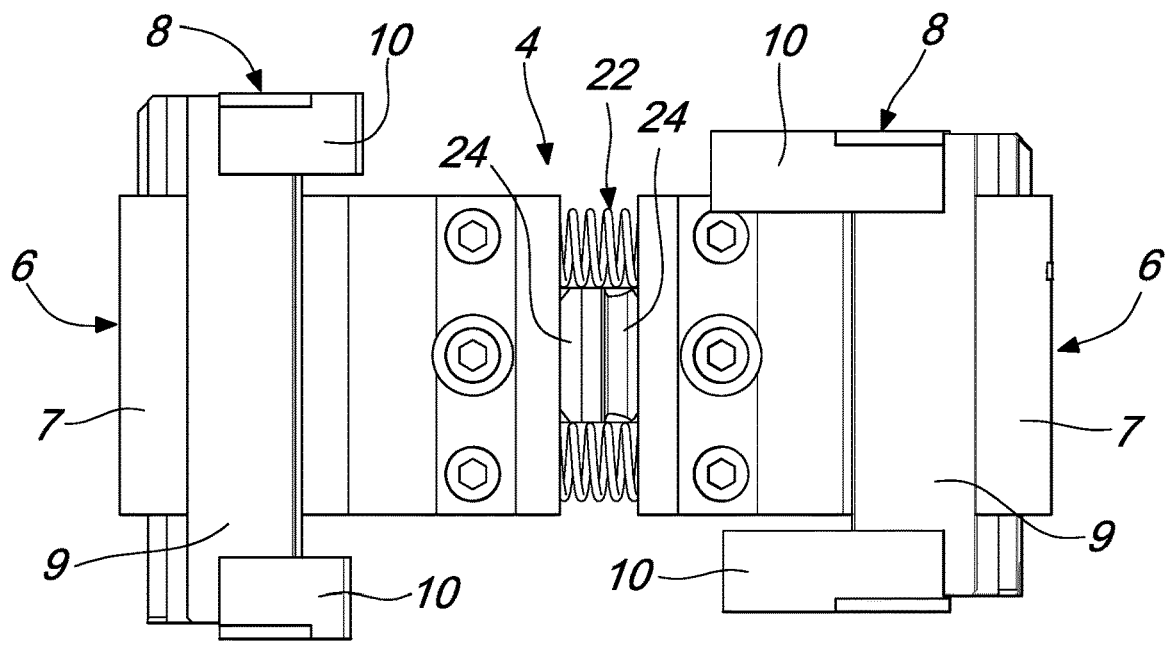
FIG. 19 is a front elevation view of the gripping device in FIG. 18.
Figure 20:
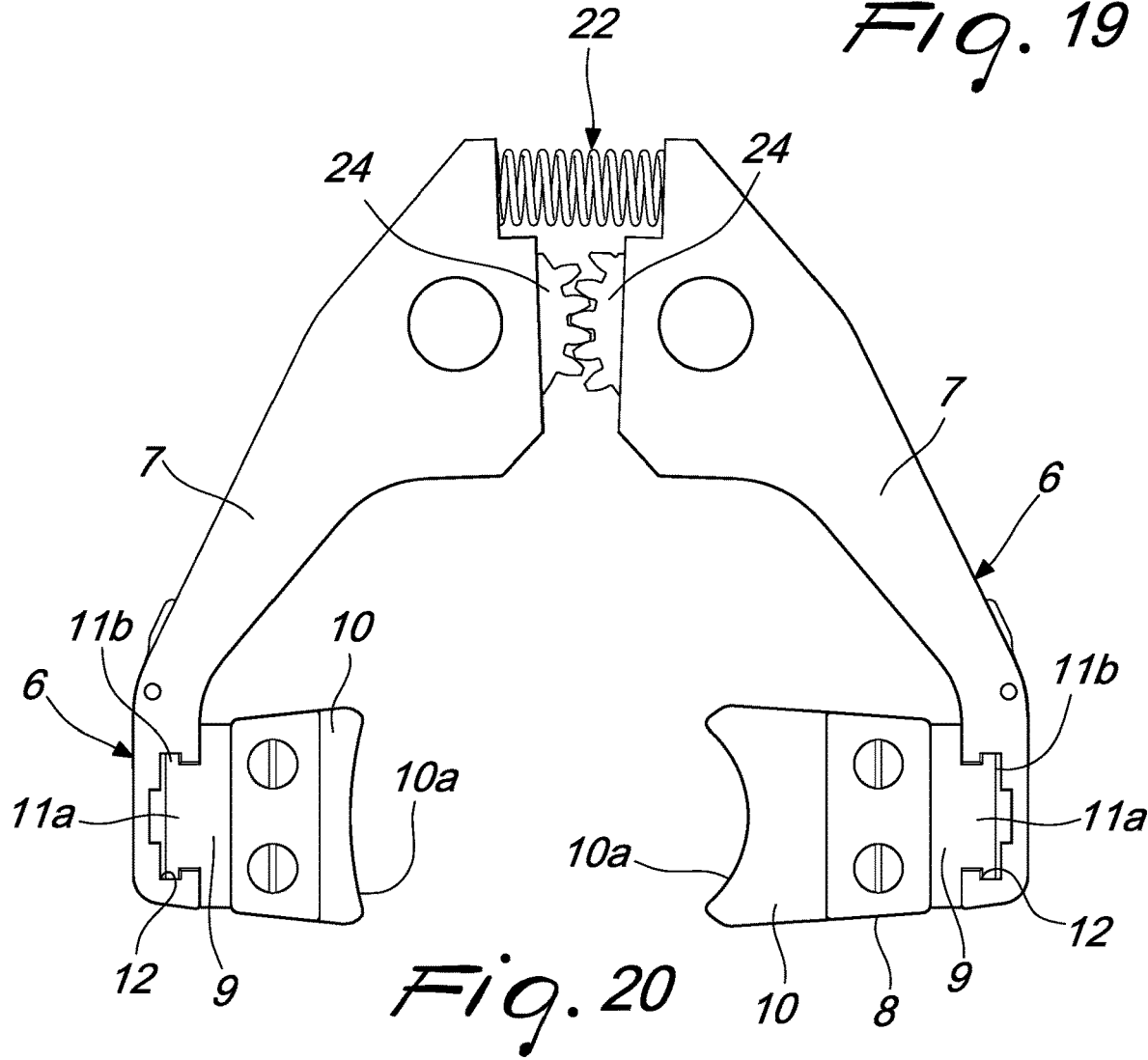
FIG. 20 is a view from above of the gripping device in FIG. 18.
Figure 21:
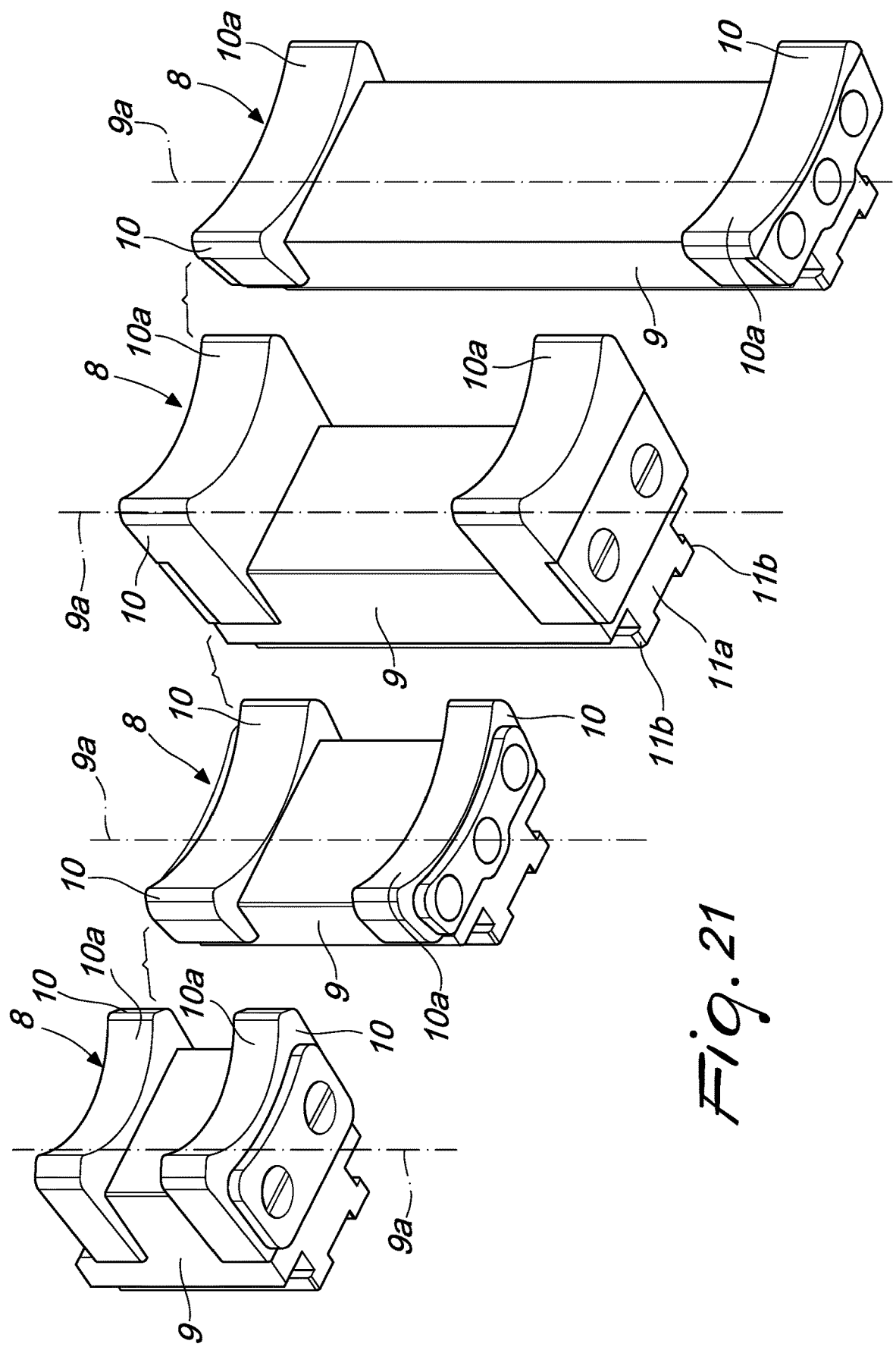
FIG. 21 is a perspective view of examples of different types of adapter elements supplied with the star conveyor according to the invention.

As in the case shown in FIGS. 18, 19 and 20, the adapter elements 8 applied to the main bodies 7 of the gripping arms 6 of a gripping device 4 can have a different shape structure from one to the next, with, in particular, but not exclusively, a different shape and size of the contact elements 10, which can for example have mutually different thickness and/or overall geometry, for example in the case where the container 5, with respect to which they are structured to match, has a shape that is not symmetrical with respect to its vertical axis.

Figure 22:
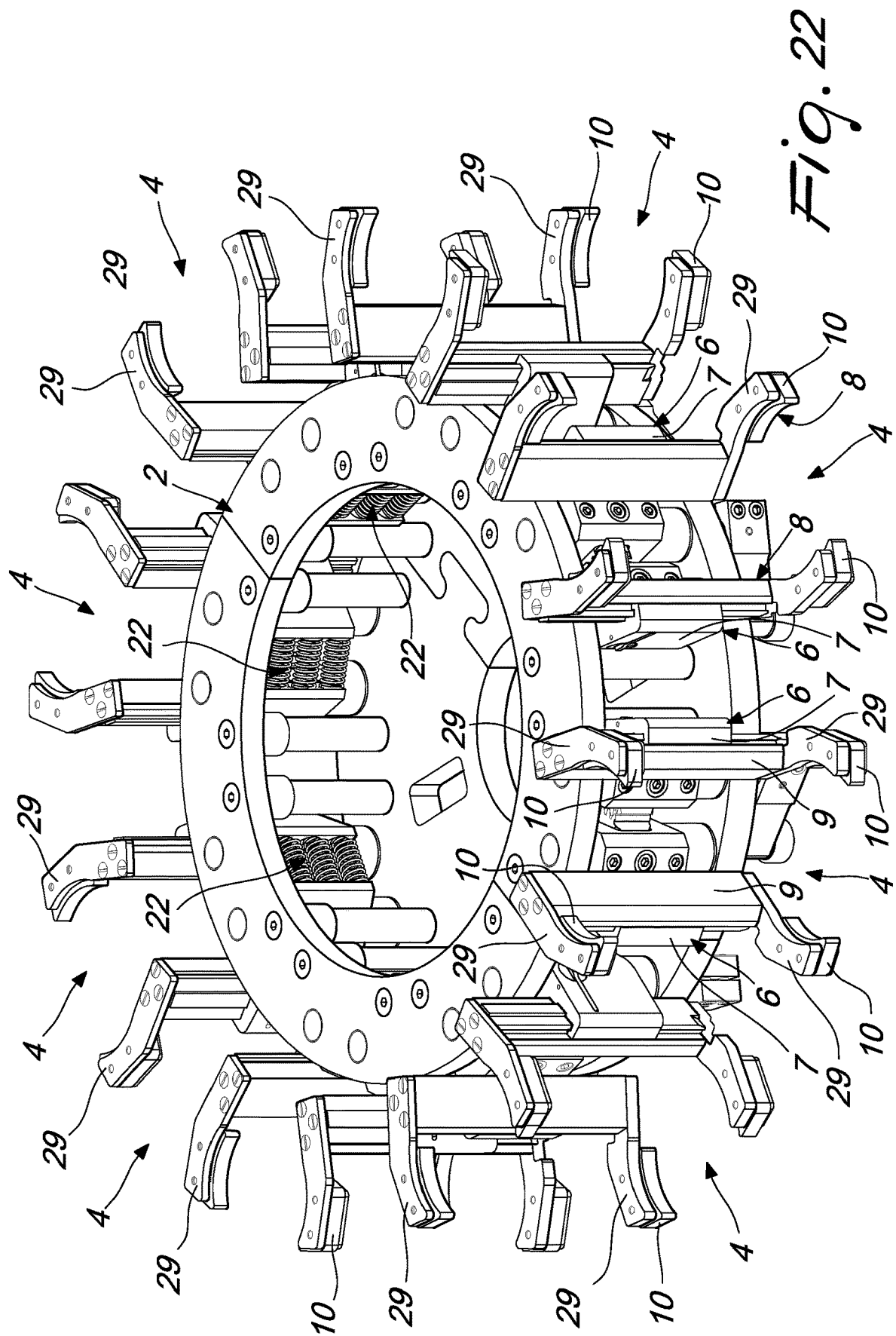
FIG. 22 is a perspective view of a star conveyor according to the invention, with the application of a different embodiment of the adapter elements.
Figure 23:
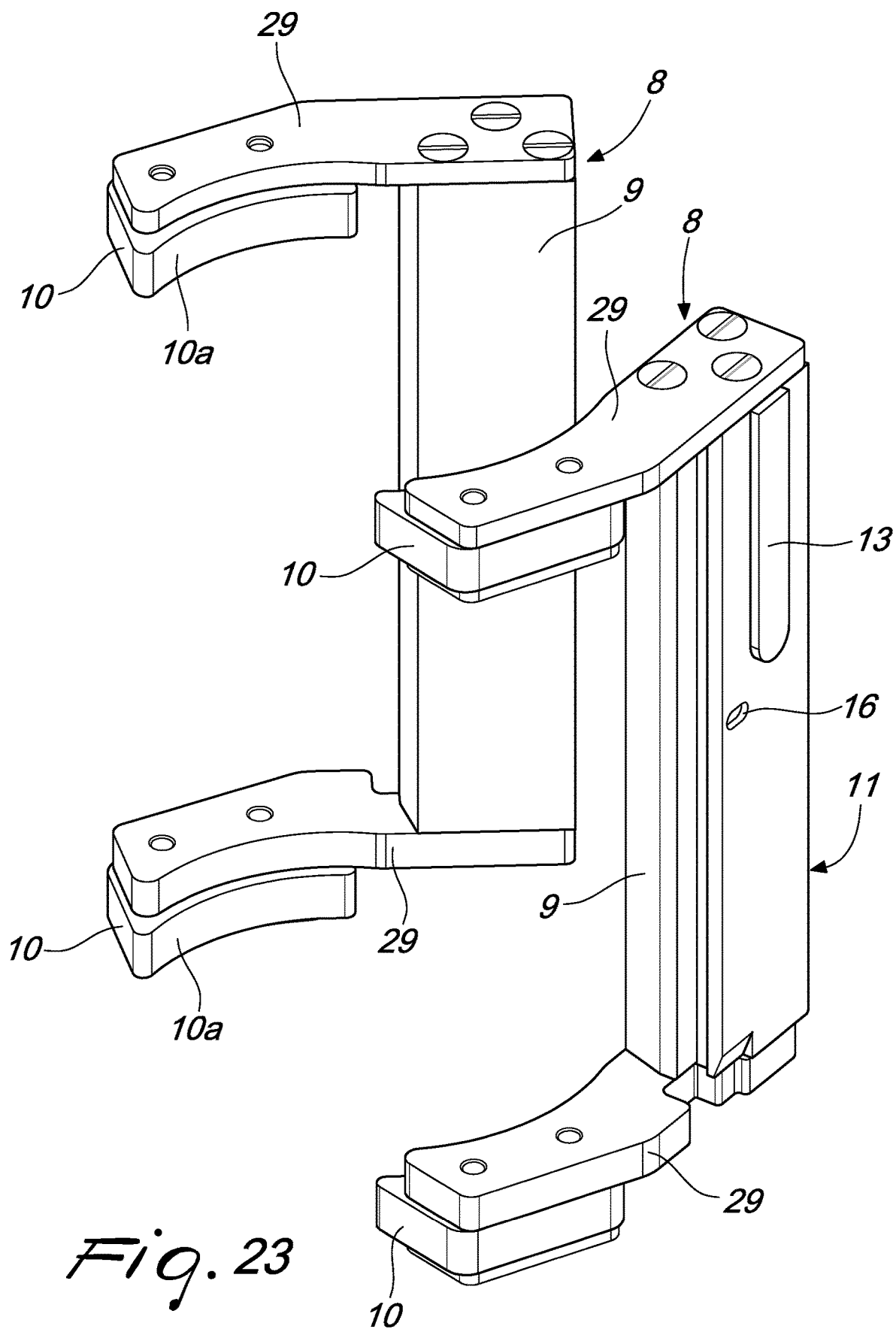
FIG. 23 is a perspective view of two adapter elements according to the embodiment in FIG. 22.

It is also possible to have a variation of embodiment of the adapter elements 8 like the one shown in FIGS. 22 and 23, in which the contact elements 10 are spaced apart with respect to the direction of extension 9a of the base body 9, along a radial direction with respect to the rotation axis 2a of the supporting body 2 of the star conveyor, so that, in particular, the position of the coupling region between the adapter elements 8 and the main bodies 7, i.e. of the means for coupling, is arranged internally with respect to the pitch diameter of the star conveyor.

This variation of embodiment is particularly susceptible of adoption for star conveyors that are mutually tangential.

Conveniently, in this case, the contact elements 10 are supported in a cantilever fashion by the respective base bodies 9 by way of a respective protruding support 29, for example lamina-shaped and protruding perpendicularly with respect to the direction of extension 9a of the base body 9 and substantially parallel to the extension of the main bodies 7 of the gripping arms 6, so as to constitute an ideal outward prolongation thereof, with respect to the rotation axis 2a of the supporting body 2 of the star conveyor.

Use of the star conveyor according to the invention is the following. If it is desired to convey, using the star conveyor according to the invention, a particular type of container 5, the adapter elements 8 of the type that corresponds to the type of container 5 that it is desired to convey are coupled to the main bodies 7 gripping arms 6 of one or more of the gripping devices 4.

When it is desired to change the type of containers 5 to be conveyed, the adapter elements 8 that were previously coupled to the main bodies 7 of the gripping arms 6 are replaced with adapter elements 8 of the type that corresponds to the new type of container 5 to be conveyed.

In practice it has been found that the invention fully achieves the intended aim and objects and, in particular, attention is drawn to the fact that having provided at least one of the gripping arms of the gripping devices with two separate elements that are mutually detachably attached, i.e. with a main body and with an adapter element that can be interchanged in order to allow the possibility to vary the configuration of the gripping arm on the basis of the type of container to be conveyed, renders the star conveyor according to the invention extremely flexible and furthermore offers the advantage to the user of the star conveyor of having only components of relatively small dimensions and, therefore, easily stored, which are constituted by adapter elements, to be interchanged in order to permit the conveyance of the various different types of container envisaged by the market.

It should also be pointed out that the star conveyor according to the invention has the major advantage of not requiring any adjustment of the gripping arms.

The invention, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102018000000708 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A star conveyor for containers which comprises at least one supporting body which can move rotatably about a rotation axis and supports peripherally a plurality of gripping devices, which are distributed around said rotation axis and are each adapted to retain a respective container to be conveyed, each one of said gripping devices comprising at least one respective pair of gripping arms which face each other and can move, with respect to each other, between a condition of clamping and a condition of releasing the corresponding container, wherein at least one gripping arm of said at least one pair of gripping arms comprises a main body and at least one adapter element which is detachably attached to said main body and is interchangeable with at least one other adapter element of a different type, in order to vary the configuration of said at least one gripping arm according to the type of container to be conveyed, wherein each one of said adapter elements comprises a base body which has a direction of extension substantially parallel to an axis of the corresponding container, wherein said base body has a face directed toward the corresponding container and the face supports at least one contact element which is shaped so as to match the corresponding container.

2. The star conveyor according to claim 1, wherein said gripping arms comprise respective main bodies and respective adapter elements which are detachably attached to said main bodies and are interchangeable in order to vary the configuration of said gripping arms according to the type of container to be conveyed.

3. The star conveyor according to claim 1, further comprising a set of at least two interchangeable sets of adapter elements which are detachably attachable to the main bodies of said gripping arms, the adapter elements of each one of said sets being structured so as to match a corresponding type of container to be conveyed.

4. The star conveyor according to claim 1, wherein the main bodies of said gripping arms extend substantially radially from said supporting body, said adapter elements being detachably attachable to said main bodies substantially at their free end, which is directed opposite from said supporting body.

5. The star conveyor according to claim 1, wherein said base body supports at least two contact elements, arranged at the opposite ends of said base body which are defined along said direction of extension and are designed to make contact with mutually vertically spaced-apart regions of the corresponding container.

6. The star conveyor according to claim 1, wherein said contact elements are made of elastically deformable material.

7. The star conveyor according to claim 1, wherein said adapter elements comprise means for quick attachment to the main bodies of said gripping arms.

8. The star conveyor according to claim 7, wherein said means for quick attachment comprise an engagement element, which is defined on a face of said base body lying opposite the face directed toward the corresponding container and is engageable with a complementarily-shaped coupling seat, which is defined on the main body of said gripping arms and can be engaged by said engagement element by way of a sliding of said base body, with respect to the main body of said gripping arms, along a direction substantially parallel to said direction of extension.

9. The star conveyor according to claim 1, further comprising detachable means for snap-locking said adapter elements with the main body of said gripping arms.

10. The star conveyor according to claim 9, wherein said detachable means for snap-locking comprise, for each one of said gripping arms, a locking element which is supported by the corresponding main body and is designed to engage with snap-action a locking seat which is defined on the base body of said adapter elements.

11. The star conveyor according to claim 10, wherein said locking element is connected to an actuation element, which can be actuated in order to cause the disengagement of said locking element from said locking seat.

12. A star conveyor for containers, comprising:
at least one supporting body rotatably movable about a rotation axis and supporting peripherally a plurality of gripping devices, wherein the gripping devices are distributed around said rotation axis, wherein each gripping device comprises at least one pair of gripping arms which face each other to provide a container receiving space and which can move, with respect to each other, between a condition of container clamping and a condition of container releasing, wherein at least one gripping arm of each pair of gripping arms comprises a main body and at least one adapter element detachably attached to said main body, wherein each adapter element is interchangeable with at least one other adapter element of a different type, in order to vary a gripping arm configuration, wherein each adapter element comprises a base body which has a direction of extension substantially parallel to a container axis, wherein said base body has a face directed toward the container receiving space and the face supports at least one contact element which is shaped so as to match a type of container to be conveyed.

13. The star conveyor according to claim 12, wherein each base body supports at least two contact elements, arranged at opposite ends of said base body which are defined along said direction of extension.

14. The star conveyor according to claim 13, wherein said contact elements are made of elastically deformable material.

15. The star conveyor according to claim 12, wherein each adapter element includes an engagement element, which is defined on a face of said base body lying opposite the face directed toward the container receiving space and is engageable with a complementarily-shaped coupling seat, which is defined on the main body and can be engaged by said engagement element by way of a sliding of said base body, with respect to the main body, along a direction substantially parallel to said direction of extension.

* * * * *